United States Patent
Yabu et al.

(10) Patent No.: US 10,300,872 B2
(45) Date of Patent: May 28, 2019

(54) VEHICLE BUMPER BEAM AND METHOD FOR MANUFACTURING VEHICLE BUMPER BEAM

(71) Applicant: HONDA MOTOR CO., LTD, Tokyo (JP)

(72) Inventors: Tomoya Yabu, Wako (JP); Shigeto Yasuhara, Wako (JP); Tadayuki Uchida, Wako (JP); Akira Hojo, Wako (JP); Masakazu Kashiwagi, Wako (JP); Junichiro Araki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 400 days.

(21) Appl. No.: 15/172,364

(22) Filed: Jun. 3, 2016

(65) Prior Publication Data
US 2016/0355150 A1  Dec. 8, 2016

(30) Foreign Application Priority Data

Jun. 5, 2015  (JP) .................. 2015-114443

(51) Int. Cl.
*B60R 19/03*  (2006.01)
*B60R 19/18*  (2006.01)

(52) U.S. Cl.
CPC ...... *B60R 19/03* (2013.01); *B60R 2019/1853* (2013.01); *B60R 2019/1866* (2013.01); *B60R 2019/1873* (2013.01)

(58) Field of Classification Search
CPC ............ B60R 19/03; B60R 2019/1873; B60R 2019/1853; B60R 2019/1866

(Continued)

(56) References Cited

U.S. PATENT DOCUMENTS

| | | | |
|---|---|---|---|
| 6,817,638 B1* | 11/2004 | Choi | B60R 19/18 293/109 |
| 2003/0227183 A1* | 12/2003 | Weissenborn | B29C 44/08 293/120 |

(Continued)

FOREIGN PATENT DOCUMENTS

| | | |
|---|---|---|
| JP | 52-50166 U1 | 4/1977 |
| JP | 57-97754 U1 | 6/1982 |

(Continued)

OTHER PUBLICATIONS

Office Action dated Jan. 25, 2017, issued in counterpart Japanese Application No. 2015-114443, with English translation (7 pages).

(Continued)

*Primary Examiner* — Jason S Morrow
*Assistant Examiner* — E Turner Hicks
(74) *Attorney, Agent, or Firm* — Westerman, Hattori, Daniels & Adrian, LLP

(57) ABSTRACT

A bumper beam formed of fiber reinforced resin containing continuous fibers oriented at least in the vehicle width direction sufficiently absorbs the collision energy of a high-speed collision in the fiber reinforced resin. The bumper beam also has a center portion positioned in the center in the vehicle width direction and protruding outward in the front-back direction, and right and left outer portions inclined from the respective ends of the center portion seen in the vehicle width direction toward the inner side in the front-back direction. The outer portions each have a resin foam member protruding outward in front-back direction. Thus, at the time of a low speed collision, the resin foam member is crushed to absorb part of the collision energy so that the energy is absorbed and distributed over the center and outer portions, protecting the car body frame from deformation.

14 Claims, 8 Drawing Sheets

(58) Field of Classification Search
USPC .......................................... 293/102, 120, 132
See application file for complete search history.

(56) References Cited

U.S. PATENT DOCUMENTS

| | | | | |
|---|---|---|---|---|
| 2011/0254295 | A1* | 10/2011 | Cave | .................... B29C 65/342 |
| | | | | 293/132 |
| 2013/0154285 | A1* | 6/2013 | Jeong | .................... B60R 19/18 |
| | | | | 293/133 |
| 2013/0175813 | A1 | 7/2013 | Mana et al. | |

FOREIGN PATENT DOCUMENTS

| | | |
|---|---|---|
| JP | 57-174153 U1 | 11/1982 |
| JP | 62-240514 A | 10/1987 |
| JP | 3-57742 A | 3/1991 |
| JP | 5-319186 A | 12/1993 |
| JP | 2569826 Y2 | 4/1998 |
| JP | 4295208 B2 | 7/2009 |
| JP | 2013-203304 A | 10/2013 |
| JP | 2014-24394 A | 2/2014 |

OTHER PUBLICATIONS

Office Action dated Nov. 16, 2016, issued in counterpart Japanese Application No. 2015-114443. (4 pages).
Office Action dated Oct. 9, 2018, issued in counterpart Chinese Application No. 201610323623.1. (6 pages).

* cited by examiner

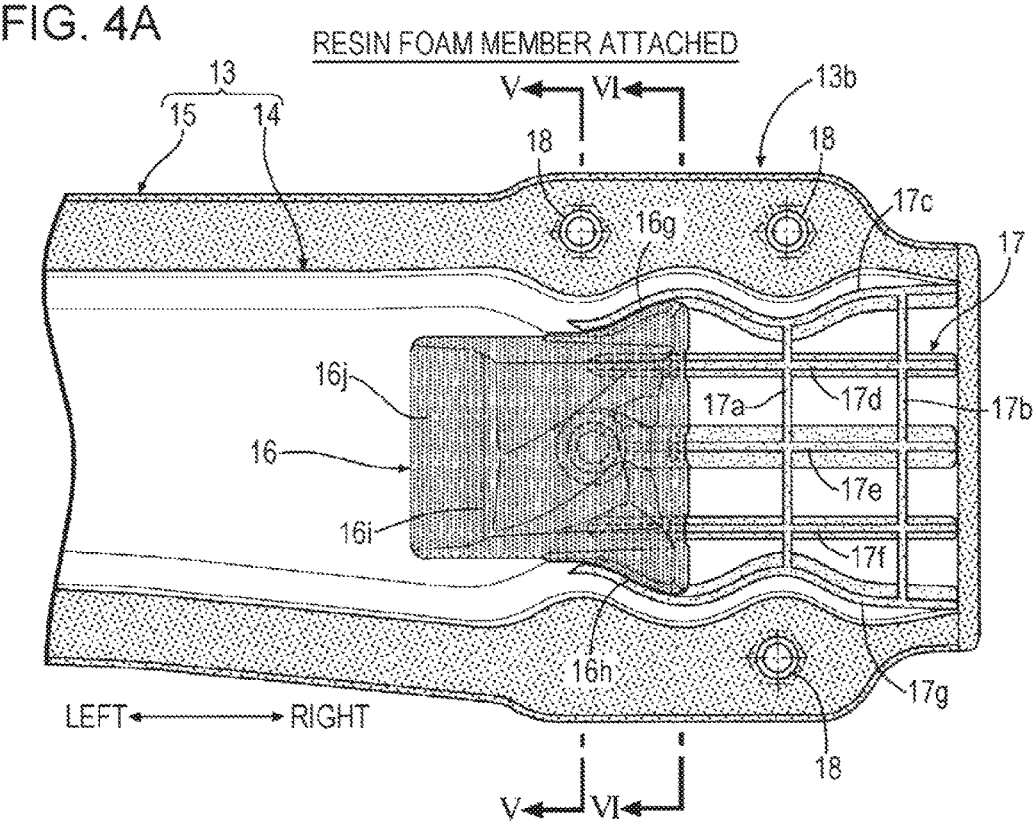
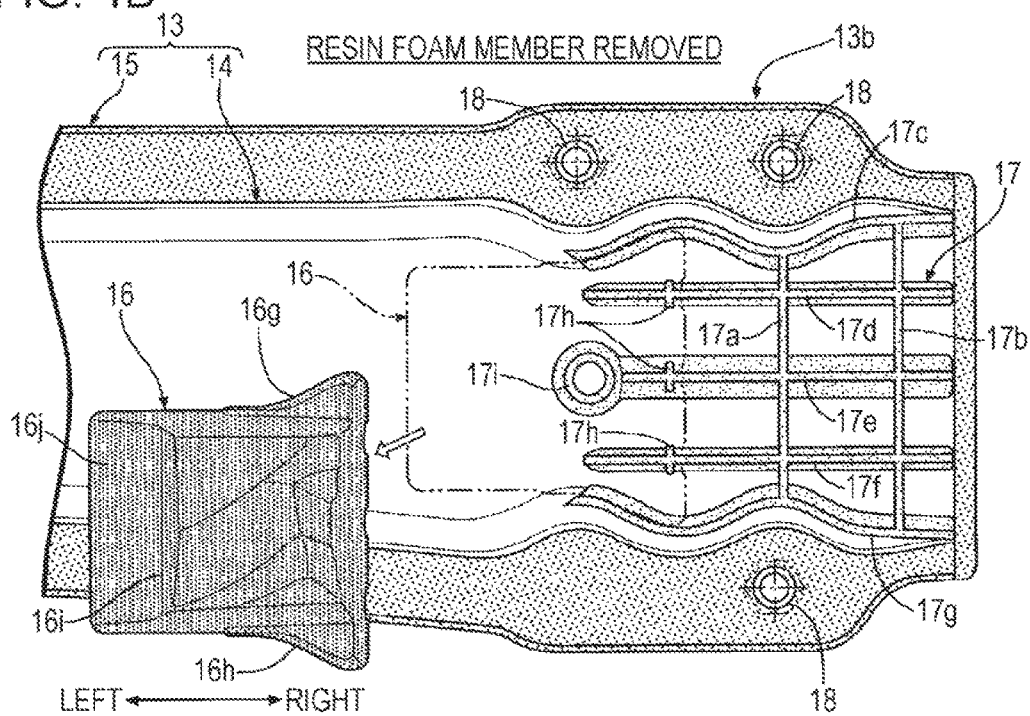

VEHICLE BUMPER BEAM AND METHOD FOR MANUFACTURING VEHICLE BUMPER BEAM

CROSS REFERENCES TO RELATED APPLICATIONS

The present application claims priority under 35 U.S.C. § 11.9 to Japanese Patent Application No. 2015-114443, filed on Jun. 3, 2015, entitled "Vehicle Samper Beam and Method for Manufacturing Vehicle Bumper Beam." The contents of this application are incorporated herein by reference in their entirety.

TECHNICAL FIELD

The present disclosure relates to a vehicle bumper beam formed of a bumper beam that is disposed in the vehicle width direction either at the front end or rear end of a car body and that is made of fiber reinforced resin containing continuous fibers oriented at least in the vehicle width direction, as well as a method for manufacturing the vehicle bumper beam.

BACKGROUND

A bumper beam structure is known from Japanese Unexamined Patent Application Publication No. 2014-24394 that is formed of a laminate with a U-shaped cross section containing a continuous fiber reinforced resin layer and a discontinuous fiber reinforced resin layer and absorbs the collision energy by causing separation of the continuous fiber reinforced resin layer and the discontinuous fiber reinforced resin layer as well as separation of the fibers and resin in those fiber reinforced resin layers with input of collision load.

Another bumper beam structure is known from Japanese Registered Utility Model No. 2569826 that includes a honeycomb structure disposed in the center of the bumper beam in the vehicle width direction and resin foam members disposed at both ends of the bumper beam in the vehicle width direction such that the honeycomb structure and the resin foam members overlap each other at the boundary between them in the front-back direction, thereby preventing an abrupt change in the collision reaction force at the boundary between the honeycomb structure and the resin foam members both in a full flat collision and a pole collision so as to reduce damage to the bumper face.

Still another bumper beam structure is known from Japanese Patent No. 4295208 that includes injection molded resin members and resin foam members of a box shape alternately disposed on the bumper beam surface in the vehicle width direction and enables inexpensive production of bumpers of different models by varying the shape of the resin foam members.

In the bumper beam structure described in Japanese Unexamined Patent Application Publication No. 2014-24394, the center of the bumper beam whose lateral ends axe supported at the rear ends of the right and left rear side frames is curved like an arc toward the back. Thus, in order to minimize the deformation of the rear side frames when the bumper beam is hit from behind at a high speed, it is necessary to enhance the strength of the bumper beam to increase the amount of energy it absorbs. This can result in the rear side frames being deformed when the bumper beam is hit from behind at a low speed incurring an increased cost for repair.

The bumper beam structure described in Japanese Registered Utility Model No. 2569826 has a disadvantage of lower energy absorption because the collision energy is absorbed by the reaction force of the honeycomb structure and the resin foam member both when the bumper beam collides with a flat barrier and when it collides with a pole or a tree.

The bumper beam structure described in Japanese Patent No. 4295208 also has a disadvantage of lower energy absorption because, as with the bumper beam structure described in Japanese Registered Utility Model No. 2569826, the bumper beam absorbs the collision energy with the reaction force of the injection molded resin member and the resin foam member.

The present disclosure has been made in view of these circumstances, for example, and provides a vehicle bumper beam that protects the car body frame from deformation by effectively absorbing the collision energy both in a collision at a high speed and a collision at a low speed.

SUMMARY

According to a first aspect, the present disclosure proposes a vehicle bumper beam formed of a bumper beam that is disposed in vehicle width direction either at a front end or rear end of a car body and that is made of fiber reinforced resin containing continuous fibers oriented at least in the vehicle width direction, in which the bumper beam includes a center portion positioned in a center in the vehicle width direction and protruding on an outer side in front-back direction, and right and left outer portions which are inclined from respective ends of the center portion seen in the vehicle width direction, toward an inner side in the front-back direction; and the right and left outer portions are each provided with a resin foam member that protrudes on the outer side in the front-back direction.

With this arrangement, the collision energy can be sufficiently absorbed by the fiber reinforced resin containing continuous fibers at the time of a full flat collision at a high speed or a pole collision at a high speed, thereby protecting the car body frame from deformation. Further, in a light collision, the resin foam members provided on the outer portions of the bumper beam are crushed to absorb part of the collision energy, so that the collision energy is absorbed and distributed over the center and outer portions of the bumper beam, protecting the car body frame from deformation.

According to a second aspect, in the vehicle bumper beam according to the first aspect, the resin foam member may include a fall preventing portion that extends on the inner side in the vehicle width direction and is connected to outer surface of the outer portion seen in the vehicle width direction.

With this arrangement, falling of the resin foam members to the inner side in the vehicle width direction due to the collision load can foe prevented by the fall preventing portion, and crushing of the resin foam members can be facilitated to enhance the effect of absorbing the collision energy.

According to a third aspect, in the vehicle bumper beam according to the first aspect, in order to support the resin foam member on the bumper beam, the resin foam member may include a fitting recess that fits with a fitting lug formed on the bumper beam; and a plurality of protruding beads that axe capable of being crushed by press fitting of the fitting lug may be formed on an inner surface of the fitting recess.

With this arrangement, the resin foam members can be attached without the need for dedicated fasteners, such as bolts, and attachment is facilitated because the beads are crushed to reduce the press fitting load when the fitting recess is pressed onto the fitting lug.

According to a fourth aspect, in the vehicle bumper beam according to the third aspect, the bumper beam may include a honeycomb structure positioned on the outer side of the resin foam member with respect to the vehicle width direction, and the fitting lug may be formed integrally with the honeycomb structure.

With this arrangement, the honeycomb structure is crushed to absorb the collision energy at the time of an oblique collision, and also the manufacturing process can be simplified due to integral formation of the fitting lug and the honeycomb structure.

According to a fifth aspect, in the vehicle bumper beam according to the fourth aspect, the honeycomb structure may include positioning portions that abut against the resin foam member to position the resin foam member.

With this arrangement, the work of aligning and fitting the fitting lug and the fitting recess with each other is facilitated and also displacement of the resin foam members can be prevented to achieve more accurate attachment.

According to a sixth aspect, in the vehicle bumper beam according to the third aspect, in order to support the resin foam member on the bumper beam, the resin foam member may include fitting grooves that fit with fitting ribs formed on the bumper beam.

With this arrangement, the resin foam members can be attached without the need for dedicated fasteners, such as bolts.

According to a seventh aspect, the present disclosure proposes a method for manufacturing the vehicle bumper beam according to the fourth aspect, the method including the steps of: fabricating, by stamp molding and as a single piece, a bumper beam body which is formed of fiber reinforced resin containing continuous fibers oriented in vehicle width direction and has a squared U-shaped cross section, and a flange made of discontinuous fiber reinforced resin and contiguous with a periphery of an opening of the bumper beam body; fabricating, by injection molding, the honeycomb structure having the fitting lug as an integral part such that the honeycomb structure extends over the bumper beam body and the flange; and attaching the resin foam member to the bumper beam by fitting the fitting recess of the resin foam member onto the fitting lug.

With this arrangement, a vehicle bumper beam that is lightweight and has high energy absorbing ability can be manufactured, and also the collision energy absorption ability can be secured at the time of a light collision even without use of crash cans, which are typically disposed between both ends of the bumper beam seen in the vehicle width direction and the car body frame. In addition, the vehicle bumper beam can be easily manufactured.

For example, the rear bumper beam 13 described in embodiments corresponds to the bumper beam in the present disclosure, horizontal ribs 17c and 17g described in embodiments correspond to the positioning portions in the present disclosure, and horizontal rib 17d to 17f described in embodiments correspond to the fitting rib in the present disclosure.

BRIEF DESCRIPTION OF THE DRAWINGS

The advantages of the disclosure will become apparent in the following description taken in conjunction with the following drawings.

FIGS. 4A and 4B are illustrations seen from the direction of arrow IV in FIG. 3.

DETAILED DESCRIPTION

An embodiment of the present disclosure will be described below with reference to FIGS. 1 to 8B. As used herein, the terms "front-back direction", "vehicle width direction" (or lateral direction), and "vertical direction" are defined with respect to a person seated in the driver's seat.

Figure 1:
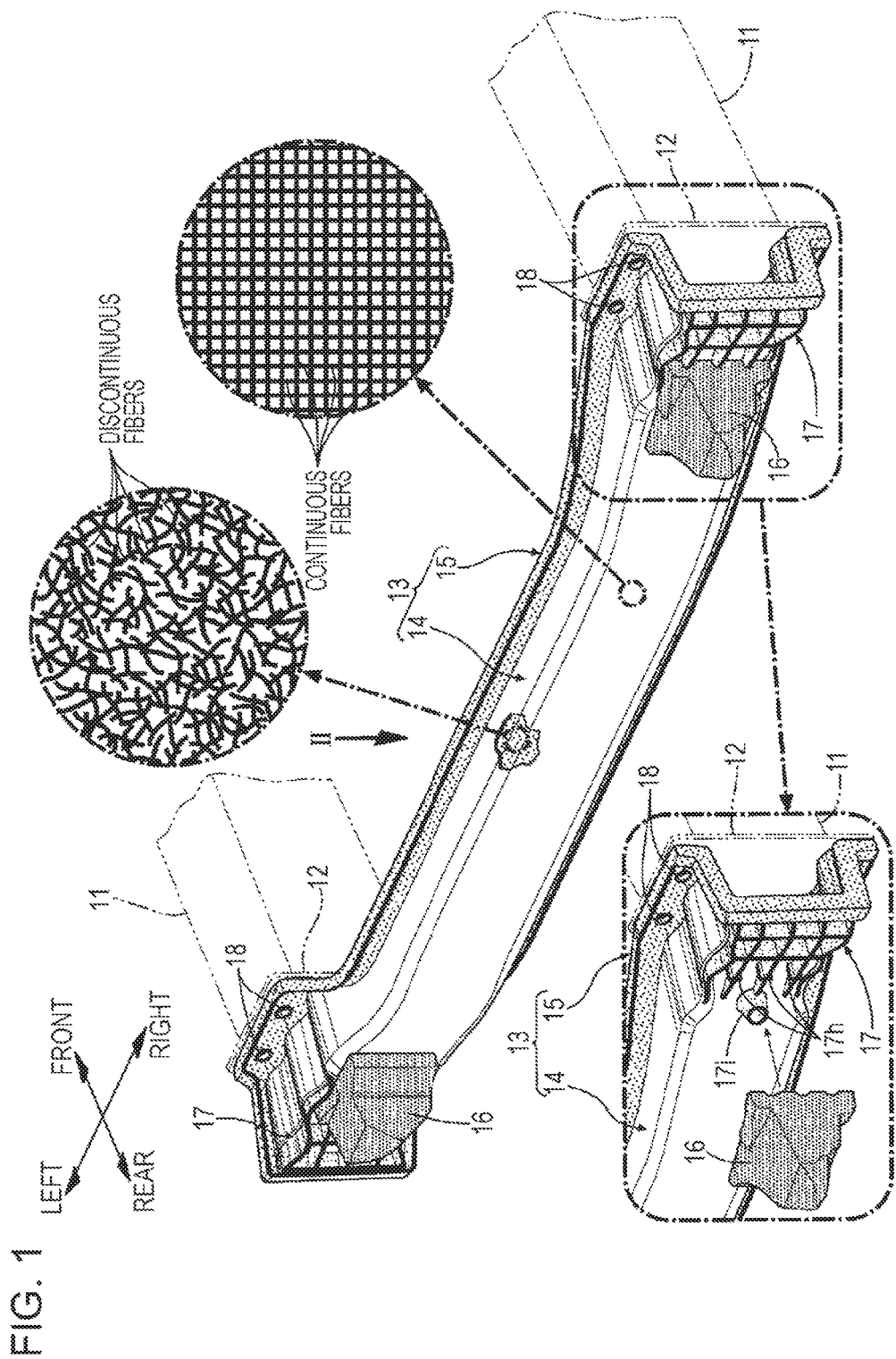
FIG. 1 is a perspective view of a rear bumper beam of an embodiment.

As illustrated in FIG. 1, a pair of right and left rear side frames 11, 11 having a rectangular closed cross section are disposed to extend in the front-back direction in the rear of the car body of an automobile. On end plates 12, 12 welded to the rear ends of the right and left rear side frames 11, 11, a rear bumper beam 13 made of carbon fiber reinforced resin (CFRP) extending in the vehicle width direction is supported. The rear bumper beam 13 includes a bumper beam body 14 having a squared U-shaped cross section which is open at the front, and a flange 15 protruding outwardly from the periphery of the opening of the bumper beam body 14.

Figure 2:
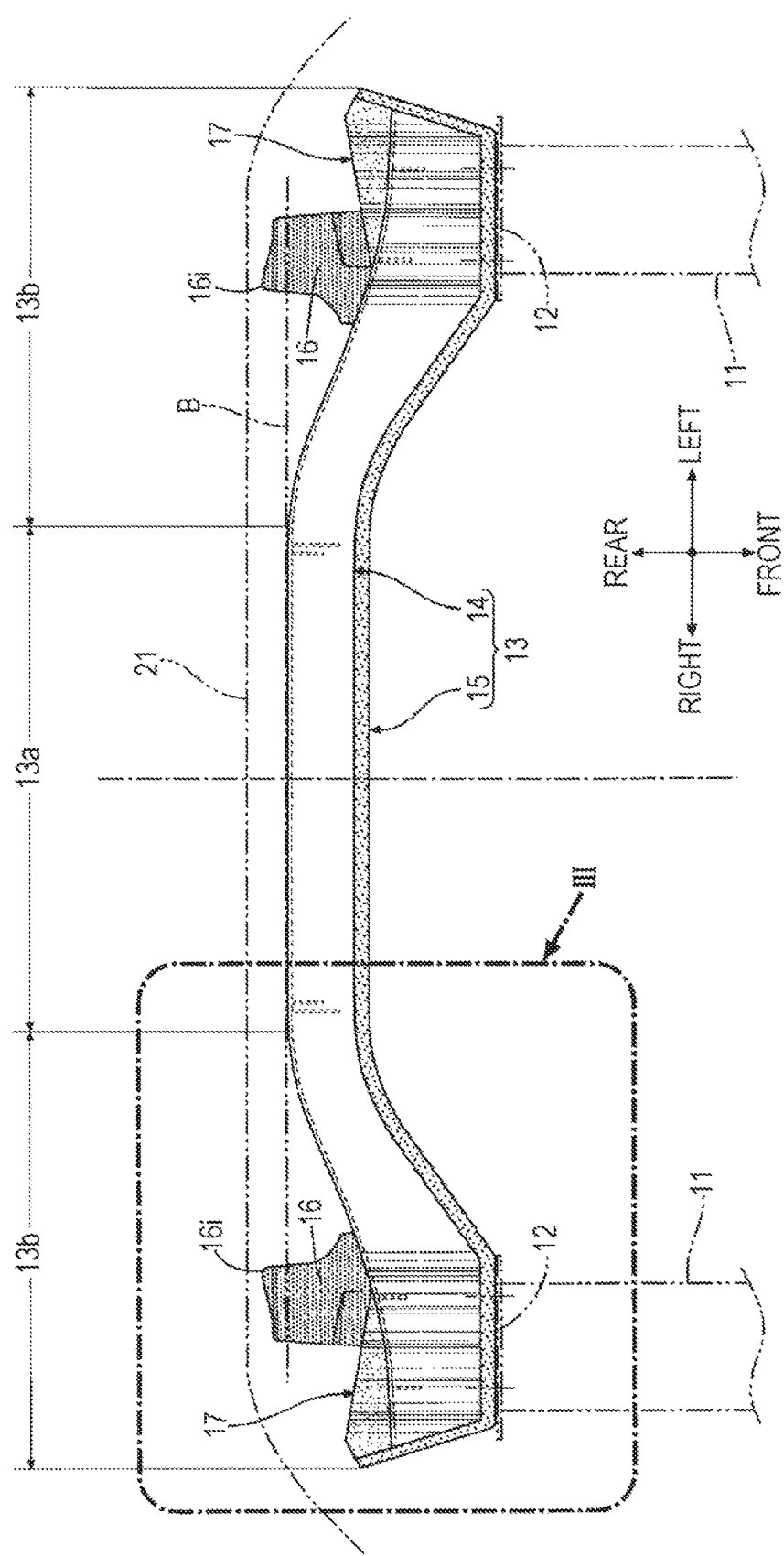
FIG. 2 illustrates the rear bumper beam seen from the direction of arrow II in FIG. 1.
Figure 3:
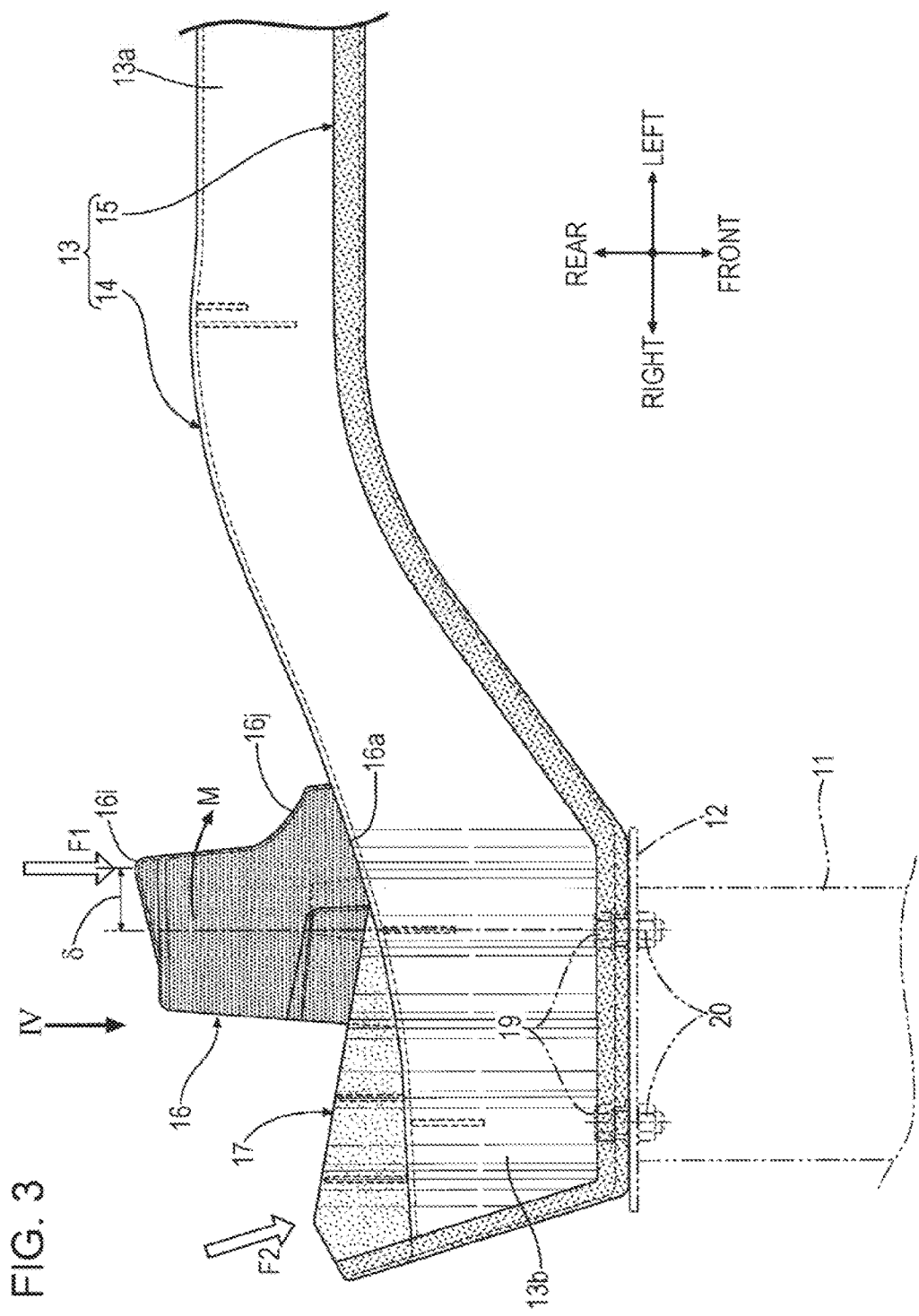
FIG. 3 is an enlarged view of the portion indicated by III in FIG. 2.
Figure 5:
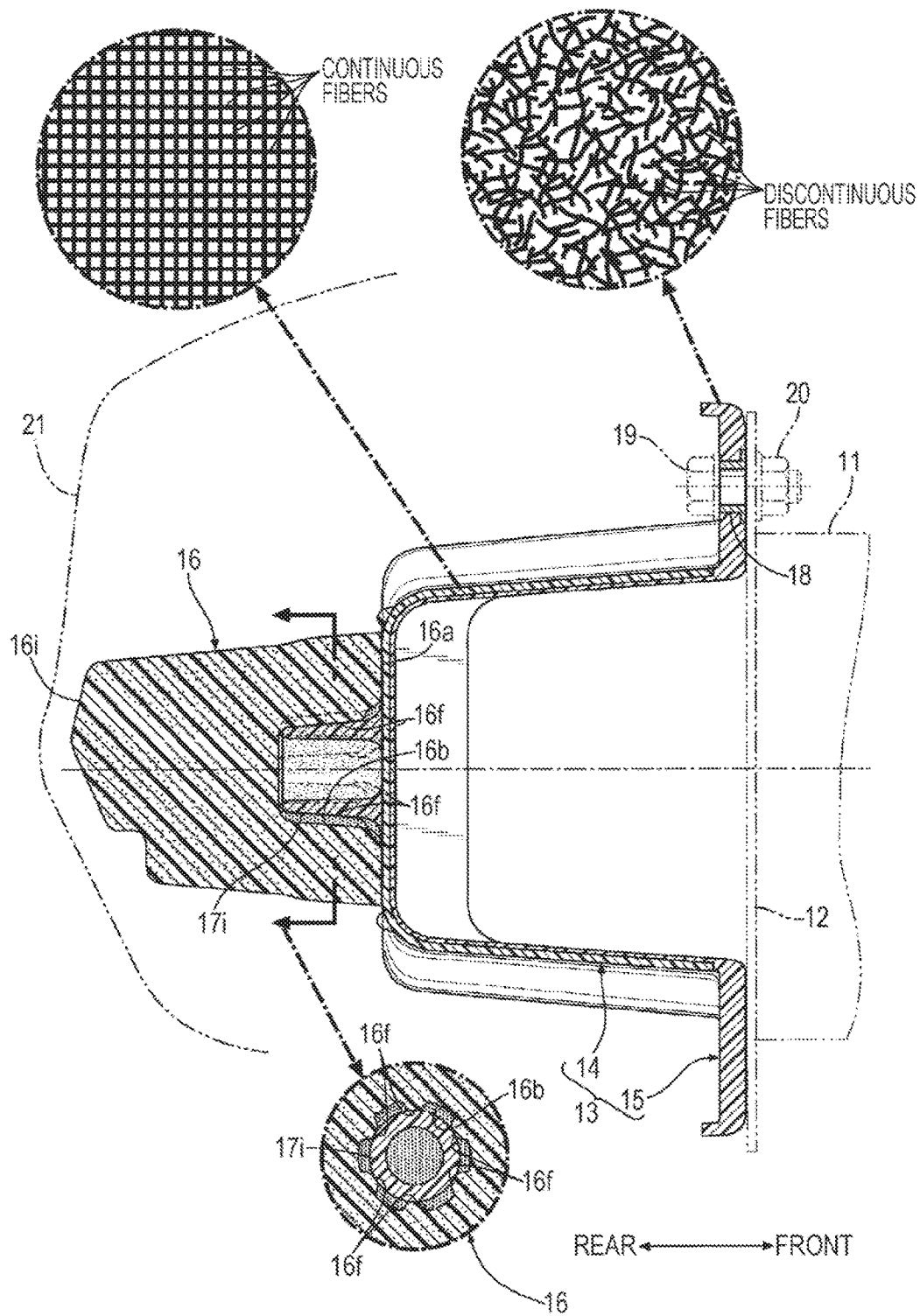
FIG. 5 is a sectional view along V-V line in FIG. 4A.
Figure 6:
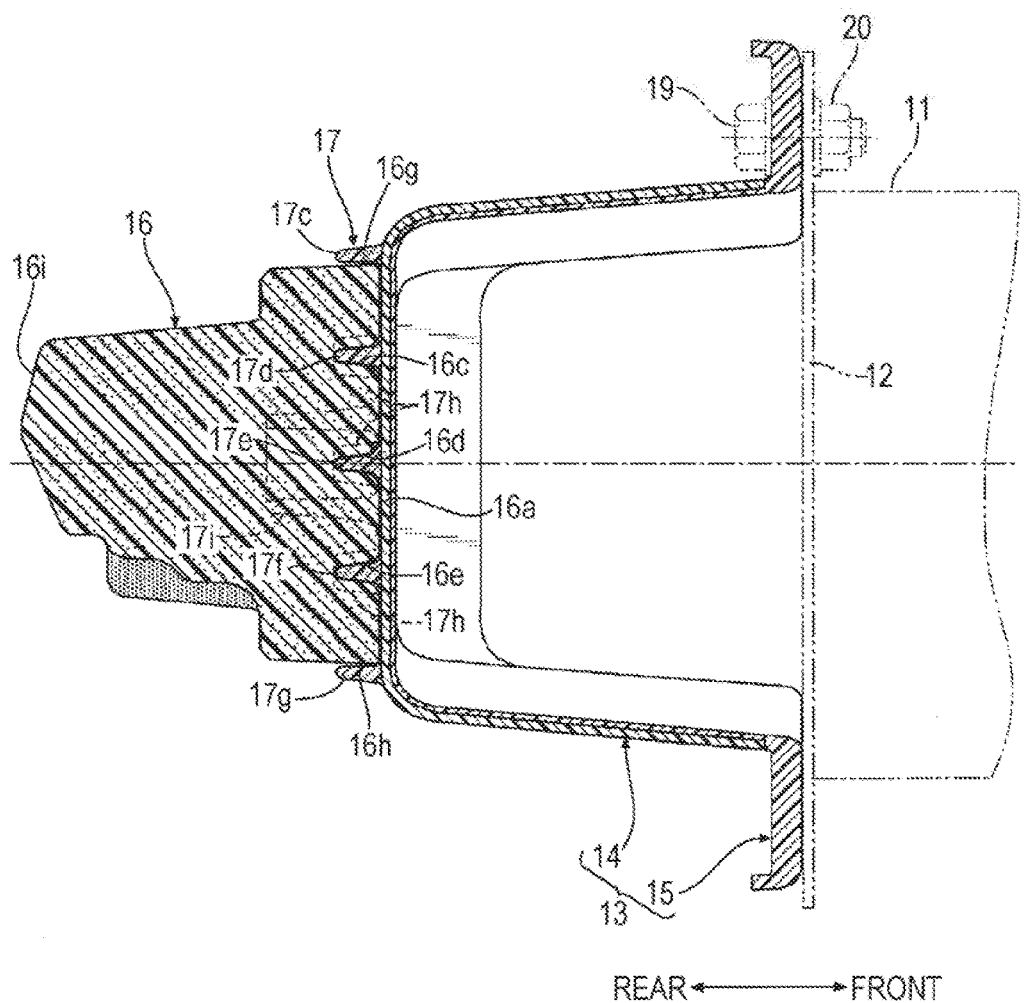
FIG. 6 is a sectional view along VI-VI line in FIG. 4A.
Figure 7A:
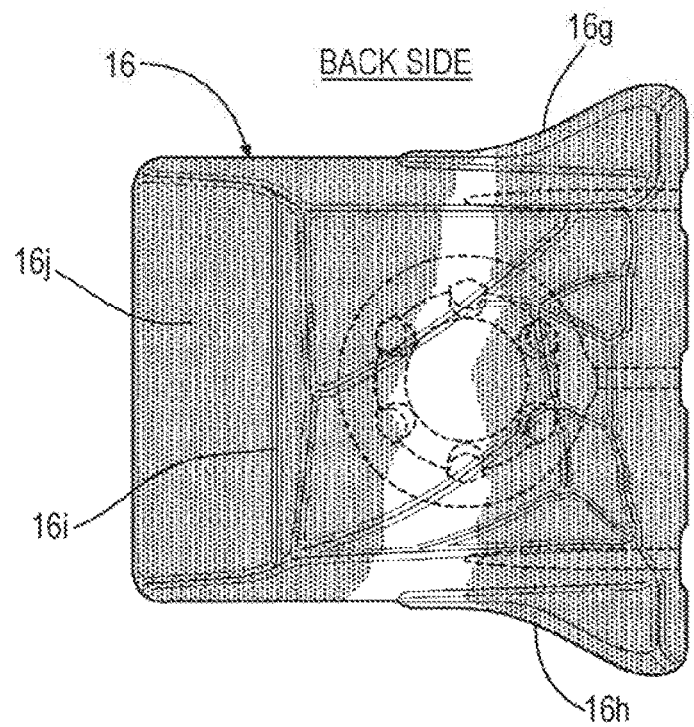
FIGS. 7A and 7B illustrate a resin foam member alone of an embodiment.
Figure 7B:
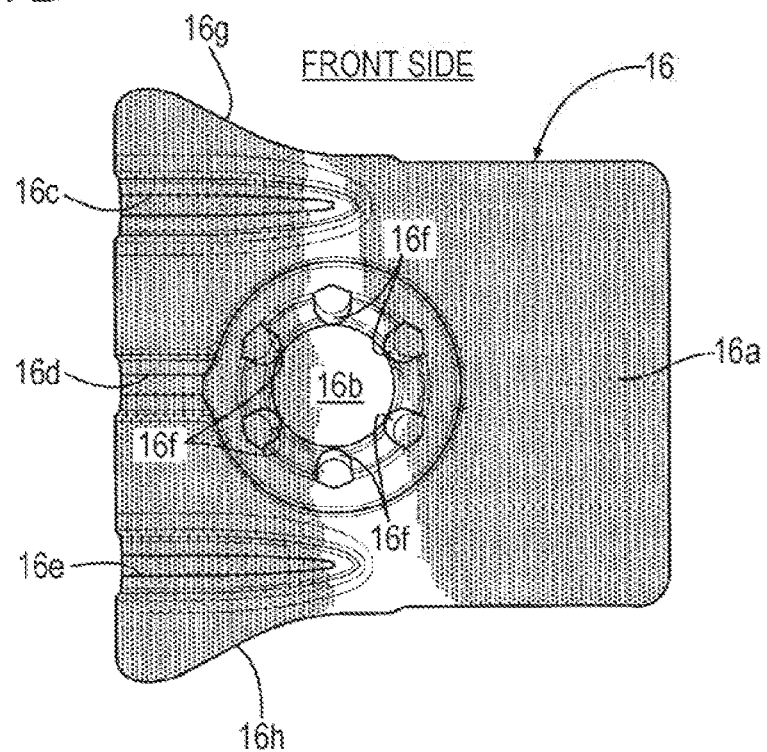

As shown in FIGS. 2 and 3, the rear bumper beam 13 has a center portion 13a positioned in the center in the vehicle width direction and extending substantially linearly, and a pair of right and left outer portions 13b, 13b which are inclined from the respective ends of the center portion 13a seen in the vehicle width direction, toward the front; the rear bumper beam 13 is curved in an arcuate shape as a whole. In the rear bumper beam 13, the center portion 13a is located at the outermost (the rear side) position in the front-back direction, while the outer portions 13b, 13b are positioned on the inner side of the center portion 13a in the front-back direction (that is, the front side).

As illustrated in FIGS. 3, 4A, and 4B, resin foam members 16, 16, which may be made of polypropylene for example, are attached on the back side of the right and left outer portions 13b, 13b. Honeycomb structures 17, 17 made of CFRP are formed integrally with the outer portions 13b, 13b such that the honeycomb structures 17, 17 are positioned adjacent to the respective resin foam members 16, 16 on the outer side thereof in the vehicle width direction.

Figure 8A:
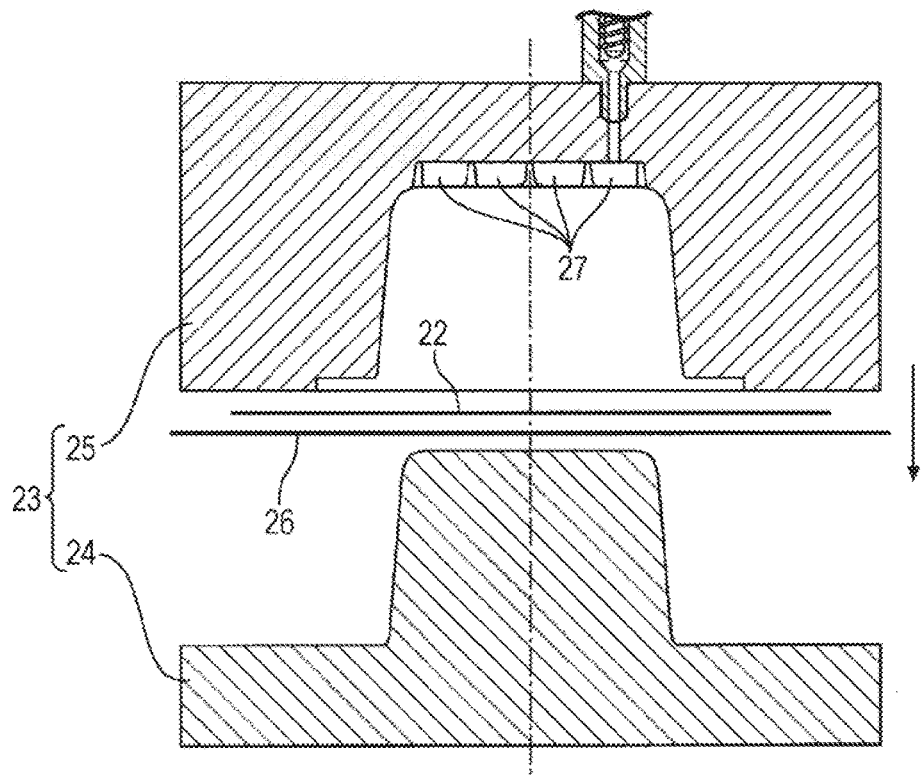
FIGS. 8A and 8B illustrate the manufacturing process of the rear bumper beam of an embodiment.
Figure 8B:
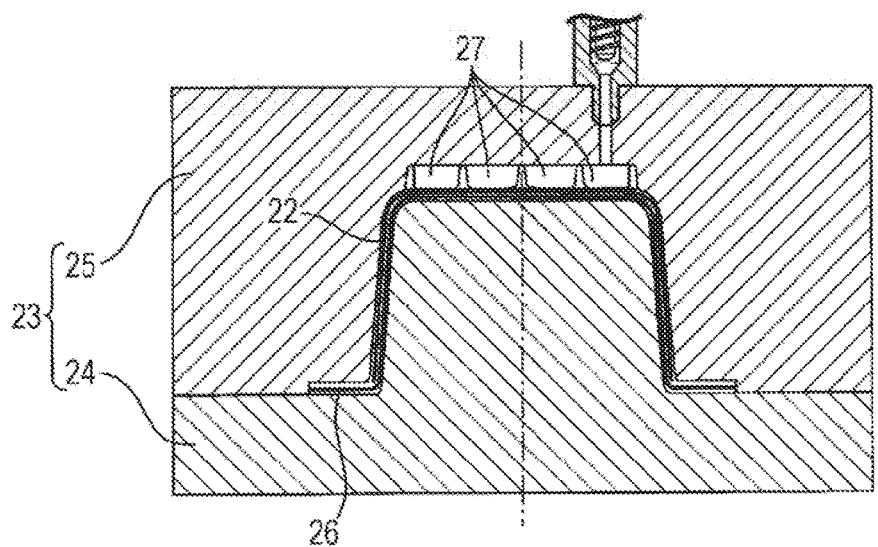

As shown in FIGS. 8A and 8B, the bumper beam body 14 is fabricated by stacking multiple layers of prepregs 22 . . . , which are produced by impregnation of a large number of carbon continuous fibers aligned in one direction with thermoplastic resin, applying heat and pressure to them in a female die 25 and a male die 24 of a mold 23 so as to molding them into a predetermined shape by stamping, and then cooling the product. The multiple layers of prepregs 22 . . . are arranged so as to make the orientations of the carbon continuous fibers intersect each other except for at least one layer of prepreg 22 that is arranged such that the orientations of the carbon continuous fibers coincide with the longitudinal direction of the rear bumper beam 13 (the vehicle width direction).

The flange 15 is molded by stamping simultaneously with the bumper beam body 14 by setting prepreg 26, which is produced by impregnation of randomly orientated carbon discontinuous fibers with thermoplastic resin, within the mold 23 together with the prepregs 22 . . . of the bumper beam body 14, applying heat and pressure to them, and then cooling them. Here, the flange 15 is stacked on and integrated with the bumper beam body 14 so that the flange 15 not only overhangs outwardly from the outer periphery of the bumper beam body 14 but overlies the front surface of the bumper beam body 14. Also, three metallic collars 18 . . . (see FIGS. 4A, 4B, and 5) are embedded in the flange 15 in each of the right and left outer portions 13b, 13b of the rear bumper beam 13.

The mold 23 for molding the bumper beam body 14 and the flange 15 has cavities 27 for molding the honeycomb structure 17. The honeycomb structure 17 is injection molded by injecting thermoplastic resin containing carbon discontinuous fibers into the cavities 27 of the mold 23 after molding the bumper beam body 14 and the flange 15.

As shown in FIGS. 4A to 6, the honeycomb structure 17 is formed of grid-like intersection of two vertical ribs 17a, 17b extending in the vertical direction and five horizontal ribs 17c to 17g extending in the vehicle width direction, where the five horizontal ribs 17c to 17g extending in the vehicle width direction extend so that they continue from the back side of the bumper beam body 14 to the back side of the flange 15. Two upper and lower horizontal ribs 17c and 17g extending in the vehicle width direction are curved in a wavy shape, whereas the other vertical ribs 17a, 17b and horizontal ribs 17d to 17f are linear. Three horizontal ribs 17d to 17f extending in the vehicle width direction have projections 17h . . . formed thereon which are aligned in a row in the vertical direction (see FIG. 4B).

Among the five horizontal ribs 17c to 17g extending in the vehicle width direction, to the inner end of the central horizontal rib 17e seen in the vehicle width direction, a fitting lug 17i of a cylindrical shape for supporting the resin foam member 16 is connected. The fitting lug 17i is molded integrally with the honeycomb structure 17.

As shown in FIGS. 4A to 7B, the resin foam member 16 has a circular fitting recess 16b and three fitting grooves 16c to 16e formed on a substantially flat attachment surface 16a, which makes contact with the back side of the outer portion 13b of the rear bumper beam 13. On the inner surface of the fitting recess 16b, protruding six beads 16f . . . are formed which are arranged at intervals of 60° and extend in the front-back direction. An upper edge 16g and a lower edge 16h of the resin foam member 16 are curved so as to abut against the upper horizontal rib 17c and lower horizontal rib 17g of the honeycomb structure 17 respectively.

At the rear end of the resin foam member 16, a bumper face supporting portion 16i that conforms to the contour of the inner wall surface of a bumper face 21 (see FIG. 5) is provided. At the front end of the resin foam member 16, a fall preventing portion 16j that bulges out on the inner side in the vehicle width direction is formed, so that the width of the resin foam member 16 in the vehicle width direction increases near the attachment surface 16a due to the presence of the fall preventing portion 16j (see FIG. 3). The bumper face supporting portion 16i of the resin foam member 16 protrudes on the rear side relative to the rear end of the center portion 13a of the rear bumper beam 13 (see FIG. 2).

The right and left outer portions 13b, 13b of the rear bumper beam 13 are fixed to the rear ends of the rear side frames 11, 11 by tightening bolts 19 . . . through the three metallic collars 18 . . . embedded in the flange 15 into three weld nuts 20 . . . provided on the front surface of the end plate 12. Next, an embodiment of the present disclosure having the arrangement described above will be described.

After molding the rear bumper beam 13 having the honeycomb structure 17 as an integral part in the mold 23, the resin foam member 16 is affixed to the rear bumper beam 13 by press-fitting the fitting recess 16b of the resin foam members 16 onto the cylindrical fitting lug 17i formed integrally with the honeycomb structure 17. In this process, the six protruding beads 16f . . . formed on the inner surface of the fitting recess 16b are pressed against the fitting lug 17i and crushed to allow the resin foam member 16 to be attached without the need for dedicated fasteners, such as bolts, and also facilitate attachment because the press fitting load generated by press fitting the fitting recess 16b onto the fitting lug 17i is reduced.

Also, the resin foam member 16 can be fixed to the honeycomb structure 17 more reliably because the resin foam member 16 has the three fitting grooves 16c to 16e to fit with the three horizontal ribs 17d to 17f of the honeycomb structure 17 and the three horizontal ribs 17d to 17f have the projections 17h . . . to be pressed into the three fitting grooves 16c to 16e.

Additionally, when the resin foam member 16 is attached to the honeycomb structure 17, the upper edge 16g and the lower edge 16h of the resin foam member 16 abut against the upper horizontal rib 17c and the lower horizontal rib 17g of the honeycomb structure 17 respectively. This facilitates the work of aligning and fitting the fitting lug 17i and the fitting recess 16b with each other and also prevents displacement of the resin foam member 16 to achieve more accurate attachment.

When the vehicle is hit from behind by another car at a high speed and the collision load of a high-speed full flat collision is input to the center portion 13a of the rear bumper beam 13, the rear bumper beam 13 is crushed to absorb the collision energy because the bumper beam body 14 of the rear bumper beam 13 has high strength by being formed of continuous fiber reinforced resin containing continuous fibers oriented in the vehicle width direction, thereby protecting the rear side frames 11, 11 supporting the rear bumper beam 13 from deformation. In the event of a pole collision, namely a collision of the rear bumper beam 13 with a pole or a tree at a high speed, the rear bumper beam 13 is similarly crushed to absorb the collision energy, protecting the rear side frames 11, 11 from deformation.

Also, the bumper face supporting portions 16i, 16i projecting to the rearmost point in the resin foam members 16, 16 provided on the right and left outer portions 13b, 13b of the rear bumper beam 13 protrude on the rear side with respect to the back side of the center portion 13a of the rear bumper beam 13 (the flat barrier surface B in FIG. 2). Accordingly, when the vehicle is hit from behind by another car at a low speed and the collision load of a low-speed full flat collision is input to the vehicle, the collision load first causes crushing of the right and left resin foam members 16, 16 and then is transferred to the center portion 13a of the rear bumper beam 13, where the collision load is distributed among the center portion 13a and the right and left outer portions 13b, 13b of the rear bumper beam 13.

Since the rear bumper beam 13 of high strength is not crushed by a low-speed full flat collision, input of a collision load only to the center portion 13a thereof would cause a large bending moment to act on the rear ends of the rear side frames 11, 11 connected to the rear bumper beam 13, possibly resulting in the deformation of the rear side frames 11, 11. According to the embodiment of the present disclosure, in contrast, the collision load is distributed over the entire area of the rear bumper beam 13 in the vehicle width direction, thus preventing acting of a large bending moment on the rear ends of the rear side frames 11, 11 to protect them from deformation.

In FIG. 3, when collision load F1 from behind is input to the resin foam member 16, since the load input point (the bumper face supporting portion 16i), which protrudes to the rearmost point in the resin foam member 16, is offset by distance δ from the center line of the resin foam member 16 toward the inner side in the vehicle width direction, moment M acts due to the collision load F1 to cause the resin foam member 16 to fall to the inner side in the vehicle width direction, potentially hampering the crushing of the resin foam member 16 and lowering the ability to absorb the collision energy. In contrast, the present embodiment provides the resin foam member 16 with the fall preventing portion 16j which extends to the inner side in the vehicle width direction and is connected to the back side of the outer portion 13b of the rear bumper beam 13. Thus, falling of the resin foam member 16 to the inner side in the vehicle width direction due to collision load F1 can be prevented by the fall preventing portion 16j, and crushing of the resin foam member 16 can be promoted to enhance the effect of absorbing the collision energy.

Furthermore, when the collision load F2 of an oblique collision is input to the outer portion 13b of the rear bumper beam 13, the honeycomb structure 17 provided on the outer portion 13b is crushed to absorb the collision energy. In addition, because of the integral formation of the fitting lug 17i and the honeycomb structure 17 for attaching the resin foam member 16 (see FIG. 4B), the manufacturing process can be simplified.

Manufacture of the rear bumper beam 13 starts with fabricating, by stamp molding and as a single piece, the bumper beam body 14 which is formed of fiber reinforced resin containing continuous fibers oriented in the vehicle width direction and has a squared U-shaped cross section, and the flange 15 made of discontinuous fiber reinforced resin and contiguous with the periphery of the opening of the bumper beam body 14. Then, the honeycomb structure 17 having the fitting lug 17i as an integral part is fabricated by injection molding such that the honeycomb structure 17 extends over the bumper beam body 14 and the flange 15, followed by attaching the resin foam member 16 to the rear bumper beam 13 by fitting the fitting recess 16b onto the fitting lug 17i of the honeycomb structure 17. Thus, a rear bumper beam 13 that is lightweight and has high energy absorbing ability can be manufactured, and also the collision energy absorption ability can be secured at the time of a light collision even without use of crash cans, which are typically disposed between both ends of the bumper beam seen in the vehicle width direction and the car body frame. In addition, the rear bumper beam 13 can be easily manufactured.

While the embodiment of the present disclosure has been described above, various modifications to design may be made to the present disclosure without departing from the scope thereof.

For example, while the embodiment above describes a rear bumper beam 13 that is disposed at the rear end of the car body in the vehicle width direction, the present disclosure is also applicable to a front bumper beam disposed at the front end of the car body in the vehicle width direction. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle bumper beam comprising:
   a bumper beam disposed along vehicle width direction either at a front end or rear end of a vehicle body, the bumper beam including fiber reinforced resin including continuous fibers oriented at least in the vehicle width direction, wherein
   the bumper beam includes a center portion positioned in a center in the vehicle width direction and protruding outward in a vehicle front-back direction, and an outer portion inclining inward in the vehicle front-back direction from an end of the center portion in the vehicle width direction, and
   the outer portion is provided with a resin foam member that protrudes outward in the vehicle front-back direction,
   wherein the bumper beam includes a fitting lug,
   the resin foam member includes a fitting recess that fits with the fitting lug of the bumper beam so as to support the resin foam member on the bumper beam, and
   the resin foam member includes a plurality of protruding beads on an inner surface of the fitting recess, the protruding beads are capable of being crushed by press fitting of the fitting lug,
   the bumper beam includes a honeycomb structure positioned on the outer side of the resin foam member with respect to the vehicle width direction, and
   the fitting lug is formed integrally with the honeycomb structure.

2. The vehicle bumper beam according to claim 1, wherein the resin foam member includes a fall preventing portion that extends inward in the vehicle width direction and is connected to an outer surface of the outer portion in the vehicle width direction.

3. The vehicle bumper beam according to claim 1, wherein the honeycomb structure includes a positioning portion that abuts against the resin foam member to position the resin foam member.

4. The vehicle bumper beam according to claim 1, wherein the bumper beam includes a fitting rib the resin foam member includes a fitting groove that fits with the fitting rib of the bumper beam so as to support the resin foam member on the bumper beam.

5. A method for manufacturing the vehicle bumper beam according to claim 1, the method comprising the steps of:
   fabricating integrally, by stamp molding, a bumper beam body including fiber reinforced resin including continuous fibers oriented in a vehicle width direction, the bumper beam body having a squared U-shape cross section, and a flange made of discontinuous fiber reinforced resin and contiguous with a periphery of an opening of the U-shape of the bumper beam body;
   fabricating, by injection molding, the honeycomb structure having the fitting lug as an integral part such that the honeycomb structure extends over the bumper beam body and the flange; and
   attaching the resin foam member to the bumper beam by fitting the fitting recess of the resin foam member onto the fitting lug.

6. The vehicle bumper beam according to claim 1, wherein the outer portion includes a right outer portion and a left outer portion disposed ends of the center portion in the vehicle width direction, respectively.

7. The vehicle bumper beam according to claim 2, wherein the resin foam member protrudes outward in the vehicle front-back direction such that an outward end of the resin foam member is located at more outward position than the center portion of the bumper beam in the vehicle front-back direction.

8. The vehicle bumper beam according to claim 7, wherein the outward end of the resin foam member is positioned on an inner side in the vehicle width direction with respect to a center of the resin foam member.

9. The vehicle bumper beam according to claim 3, wherein the positioning portion of the honeycomb structure includes a rib extending in the vehicle width direction, and a side surface of the resin foam member abuts against the rib.

10. The vehicle bumper beam according to claim 9, wherein the rib of the positioning portion has a wavy shape.

11. The vehicle bumper beam according to claim 9, wherein the rib of the positioning portion includes an upper rib and a lower rib, and the resin foam member is interposed between the upper rib and the lower rib.

12. The vehicle bumper beam according to claim 11, wherein the upper rib and the lower rib of the positioning portion each have a wavy shape, an upper edge and a lower edge of the resin foam member are curved corresponding to the wavy shape of the upper rib and the lower rib.

13. The vehicle bumper beam according to claim 1, wherein the honeycomb structure is disposed at an outer end of the outer portion in the vehicle width direction.

14. A vehicle comprising the vehicle bumper beam according to claim 1.

* * * * *